United States Patent
Sakata et al.

(10) Patent No.: US 7,965,727 B2
(45) Date of Patent: Jun. 21, 2011

(54) BROADCAST DISTRIBUTING SYSTEM AND BROADCAST DISTRIBUTING METHOD

(75) Inventors: Takashi Sakata, Kawasaki (JP); Noboru Iwabuchi, Kawasaki (JP); Takashi Kawakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 11/878,915

(22) Filed: Jul. 27, 2007

(65) Prior Publication Data

US 2008/0069131 A1    Mar. 20, 2008

(30) Foreign Application Priority Data

Sep. 14, 2006 (JP) ................................. 2006-249830

(51) Int. Cl.
*H04L 12/56* (2006.01)
(52) U.S. Cl. .................. 370/412; 370/236; 370/392
(58) Field of Classification Search .................. 370/229, 370/231, 235, 236, 392; 709/230
See application file for complete search history.

(56) References Cited

U.S. PATENT DOCUMENTS

| | | | |
|---|---|---|---|
| 6,188,670 B1 * | 2/2001 | Lackman et al. | 370/231 |
| 6,269,080 B1 * | 7/2001 | Kumar | 370/236 |
| 6,615,381 B1 | 9/2003 | Fukuda et al. | |
| 7,406,078 B2 * | 7/2008 | Jeon | 370/392 |
| 2001/0049739 A1 * | 12/2001 | Wakayama et al. | 709/230 |
| 2003/0063324 A1 * | 4/2003 | Takaoka | 358/404 |
| 2003/0112758 A1 * | 6/2003 | Pang et al. | 370/235 |
| 2004/0223455 A1 * | 11/2004 | Fong et al. | 370/229 |
| 2009/0248829 A1 * | 10/2009 | Habetha et al. | 709/208 |

FOREIGN PATENT DOCUMENTS

| | | |
|---|---|---|
| JP | 11-355854 | 12/1999 |
| JP | 2006-025278 | 1/2006 |
| JP | 2006-174231 A | 6/2006 |

OTHER PUBLICATIONS

Japanese Notice of Rejection, English-language translation, mailed Dec. 21, 2010 for corresponding Japanese Application No. 2006-249830.

* cited by examiner

*Primary Examiner* — Jayanti K Patel
*Assistant Examiner* — Matthew Campbell
(74) *Attorney, Agent, or Firm* — Fujitsu Patent Center (57) ABSTRACT

An IP encapsulator in a broadcast distributing system divides broadcast data received from an image distributing source into packets, and IP-encapsulates the packets. The IP encapsulator transmits the IP-encapsulated packets to a subscriber line terminal (SLT) via a network. The SLT includes a memory that stores therein broadcast data, and performs TOS control and transfer-route switching control based on memory occupancy of the SLT.

7 Claims, 11 Drawing Sheets

TO SPLITTER SECTION

RTT: ROUND TRIP TIME (ROUND-TRIP DELAY TIME)
W/2×RT: CYCLE AT WHICH PACKET REJECTION OCCURS

BROADCAST DISTRIBUTING SYSTEM AND BROADCAST DISTRIBUTING METHOD

BACKGROUND OF THE INVENTION

1. Field of the Invention

The present invention generally relates to a broadcast distribution technique, and particularly relates to broadcast distribution via an Internet protocol (IP) network.

2. Description of the Related Art

Television broadcast programs, radio broadcast programs and the like are typically distributed by radio waves. The advantage of distributing the broadcast programs by radio waves is that users located at different locations can view the same program at the same time.

However, in recent years, with developments in network technology, there is an increasing demand for a broadcasting scheme other than the conventional radio-wave-based distribution.

For example, Japanese Patent Application Laid-open No. 2006-25278 discloses a mobile terminal capable of directly receiving broadcast programs from a television network. However, due to some reasons if it is difficult to directly receive a broadcast program from a television station, the mobile terminal receives the broadcast program from a base station instead of the television station. On the other hand, Japanese Patent Application Laid-open No. H11-355854 discloses an on-vehicle broadcast receiving device capable of selectively receiving information required to operate or drive the vehicle from among information broadcast from a base station.

It is economically or due to other reasons difficult to newly establish a transmission medium that can replace the radio-wave-based distribution. Therefore, it is cost effective to use an existing transmission medium such as the Internet.

However, the Internet has a drawback that the bandwidth required for data delivery and the time required until arrival of data to a terminal cannot be guaranteed. In other words, delay can occur when a broadcast program is distributed via the Internet network to two different terminals using the conventional technology. As a result, it is almost impossible to use the Internet to perform simultaneous broadcasting (simulcasting).

Furthermore, distribution of a broadcast program, e.g., television broadcasting, includes sending of a large amount of data via a network. As a result, a huge workload is exerted on the network.

SUMMARY OF THE INVENTION

It is an object of the present invention to at least partially solve the problems in the conventional technology.

According to an aspect of the present invention, a broadcast distributing system that divides broadcast data into a plurality of packet data and distributes the packet data via a network includes a transmitting apparatus that sets a transfer precedence of each of the packet data and that transmits each of the packet data into the network based on the transfer precedence set in the packet data; and a receiving apparatus that receives the packet data transmitted by the transmitting apparatus via the network, temporarily stores the packet data in a memory and outputs the packet data stored in the memory, and periodically reports a buffer occupancy of the memory to the transmitting apparatus, wherein the transmitting apparatus sets the transfer precedence of each of the packet data based on the buffer occupancy of the memory.

According to another aspect of the present invention, a method of dividing broadcast data into a plurality of packet data and distributing the packet data via a network, the method being realized in a broadcast distributing system that includes a transmitting apparatus connected to a receiving apparatus via a network includes the transmitting apparatus setting a transfer precedence of each of the packet data and transmitting each of the packet data into the network based on the transfer precedence set in the packet data; and the receiving apparatus receiving the packet data transmitted by the transmitting apparatus via the network, temporarily storing the packet data in a memory and outputting the packet data stored in the memory, and periodically reporting a buffer occupancy of the memory to the transmitting apparatus, wherein the transmitting apparatus sets the transfer precedence of each of the packet data based on the buffer occupancy of the memory.

According to still another aspect of the present invention, a network apparatus includes a handover unit that reads a transfer precedence assigned to packet data and that hands over the transfer precedence to a multiprotocol label switching header; and an input unit that inputs data, to which the multiprotocol label switching header is assigned, to a network that performs data transfer by multiprotocol label switching.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained hereinafter with reference to the accompanying drawings.

First, an overview of a broadcast distributing system according to a first embodiment of the present invention will be described with reference to FIG. 1. The broadcast distributing system according to the first embodiment includes an image distributing source 1, an IP encapsulator 2, a network 3, and a plurality of subscriber line terminals (SLTs) 11 to 13. The IP encapsulator 2 IP-encapsulates image data received from the image distributing source 1. The IP encapsulator 2 transmits the IP-encapsulated image data to the subscriber line terminal (SLT) 12 via the network 3.

The SLT 12 receives the IP-encapsulated image data from the network 3 and temporarily stores the packet data in a memory, and subsequently transmits the image data to each user terminal. The SLT 12 receives, for example, ten channels' worth of television broadcast programs from the image distributing source 1 via the IP encapsulator 2 and the network 3. The SLT 12 temporarily stores the television broadcast programs in the memory and transmits to the user terminal the image data corresponding to one channel that is designated by the user terminal.

The SLT 12 is connected to the other SLTs 11 and 13, and image data can be transferred among the SLTs. In other words, the SLT 11 can receive the ten channels' worth of television broadcast programs from the SLT 12, and distribute to the user terminal the image data corresponding to the channel designated by the user terminal.

The SLT 12 notifies the IP encapsulator 2 of an amount of data accumulated in the memory (hereinafter, "buffer occupancy or BOC") of the SLT 12 via the network 3. The IP encapsulator 2 performs a type-of-service (TOS) control based on the BOC of the SLT 12. In other words, the IP encapsulator 2 performs precedence control for transfer of the packet data.

Figure 1:
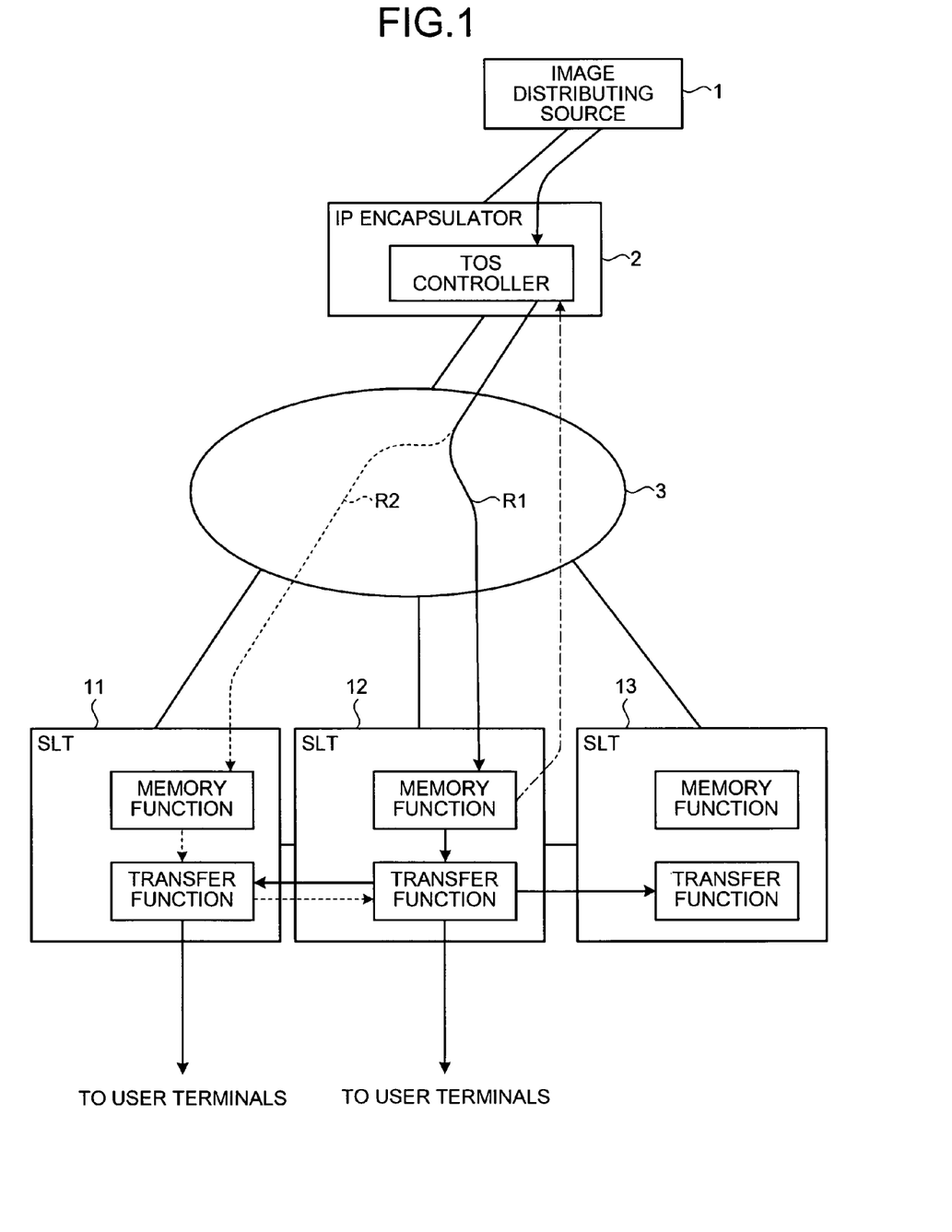
FIG. 1 is a schematic of a broadcast distributing system according to a first embodiment of the present invention.

For example, in the broadcast distributing system shown in FIG. 1, when the BOC of the SLT 12 decreases, the IP encapsulator 2 raises a transfer precedence of the packet data, and preferentially transfers broadcast data to the SLT 12 based on the transfer precedence. On the other hand, when the BOC of the SLT 12 increases, the IP encapsulator 2 lowers the transfer precedence of the packet data. With this technique, it becomes possible to prevent underflow or overflow of data accumulated in the memory, and stably distribute broadcast programs while minimizing the memory capacity of the memory of the SLT 12.

If the memory capacity of the memory of the SLT 12 is large, it takes longer time to completely fill the memory, and a long delay occurs before a content of the broadcast is sent to the user terminal. By reducing the memory capacity of the memory, therefore, the delay can be shortened and simulcasting can be realized.

In addition, moving images, such as those in a television broadcast program, are large in amount of data. If such large amount of the data is continuously input to the network 3 with a high precedence, data traffic becomes heavy. Therefore, if the BOC of the SLT 12 is sufficiently large, the packet transfer precedence is lowered, whereby the traffic of the network 3 can be lessened.

If the BOC of the SLT 12 is equal to or smaller than a threshold, a shortage of data to be distributed to the user terminal can be prevented by changing a transfer route within the network 3.

When changing the data acquisition route, the SLT 12 can select a route that goes through another SLT. For example, in FIG. 1, the SLT 12 acquires the data to be distributed via a route R1. However, if the SLT 12 cannot acquire the data via the route R1 due to occurrence of a failure or the like within the network 3, the BOC of the SLT 12 decreases to be equal to or smaller than the threshold. In such a case, the SLT 12 changes the route to a route R2.

In the route R2, the SLT 11 acquires the data to be distributed from the network 3 and transfers the data to the SLT 12. Therefore, the SLT 12 is not necessarily required to directly receive the data from the network 3. As long as the SLT 12 can acquire the data more quickly and more stably by changing routes only within the network 3 rather than selecting the route that goes through another SLT, the SLT 12 changes the routes only within the network 3.

Figure 2:
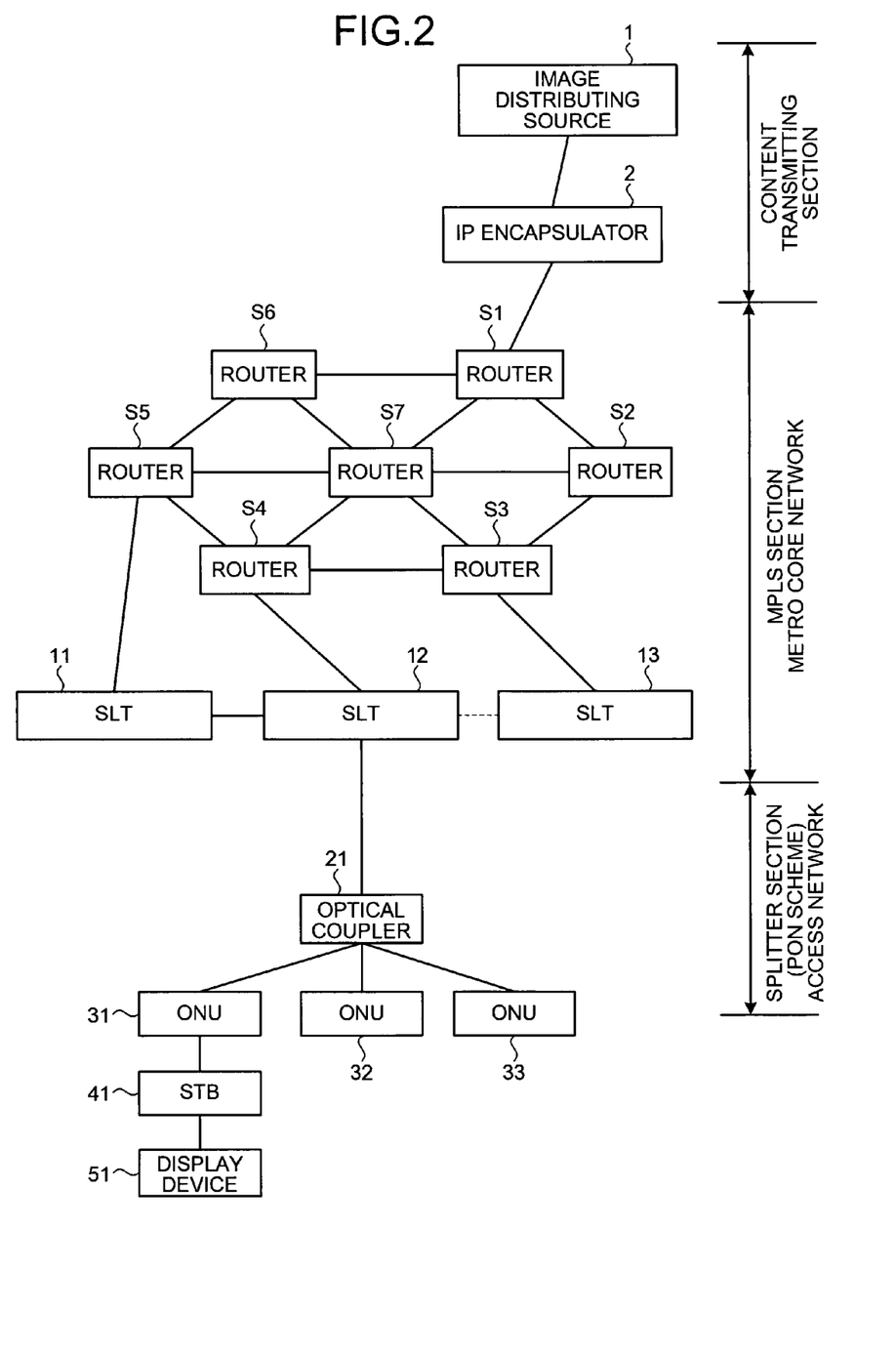
FIG. 2 is a schematic for explaining an example of a detailed configuration of the broadcast distributing system shown in FIG. 1.

A specific example of a configuration of the broadcast distributing system will be explained with reference to FIG. 2. In FIG. 2, the broadcast distributing system is divided into a content transmitting section, a multiprotocol label switching (MPLS) section, and a splitter section.

The content transmitting section includes the image distributing source 1 and the IP encapsulator 2. The content transmitting section is preferably installed in a television station, a content distributor, or the like.

The MPLS section, which corresponds to the network 3, is a metro core network in an existing Internet network. Specifically, the MPLS section is a network infrastructure laid down in a telephone station by an Internet provider and includes multiprotocol switching routers (hereinafter, "routers") S1 to S7 in FIG. 2.

The splitter section is an access network in the existing Internet network based on a passive optical network (PON) scheme, and includes an optical coupler 21 and optical network units (ONU) 31 to 33. Specifically, the ONUs 31 to 33 are connected to the SLT 12 via the optical coupler 21, and the user terminals are connected to the respective ONUs 31 to 33. For example, a set-top box (STB) 41 and a display device 51 are connected to the ONU 31. The display device 51 is, for example, a television or a personal computer used to view and listen to the broadcast program.

Figure 3:
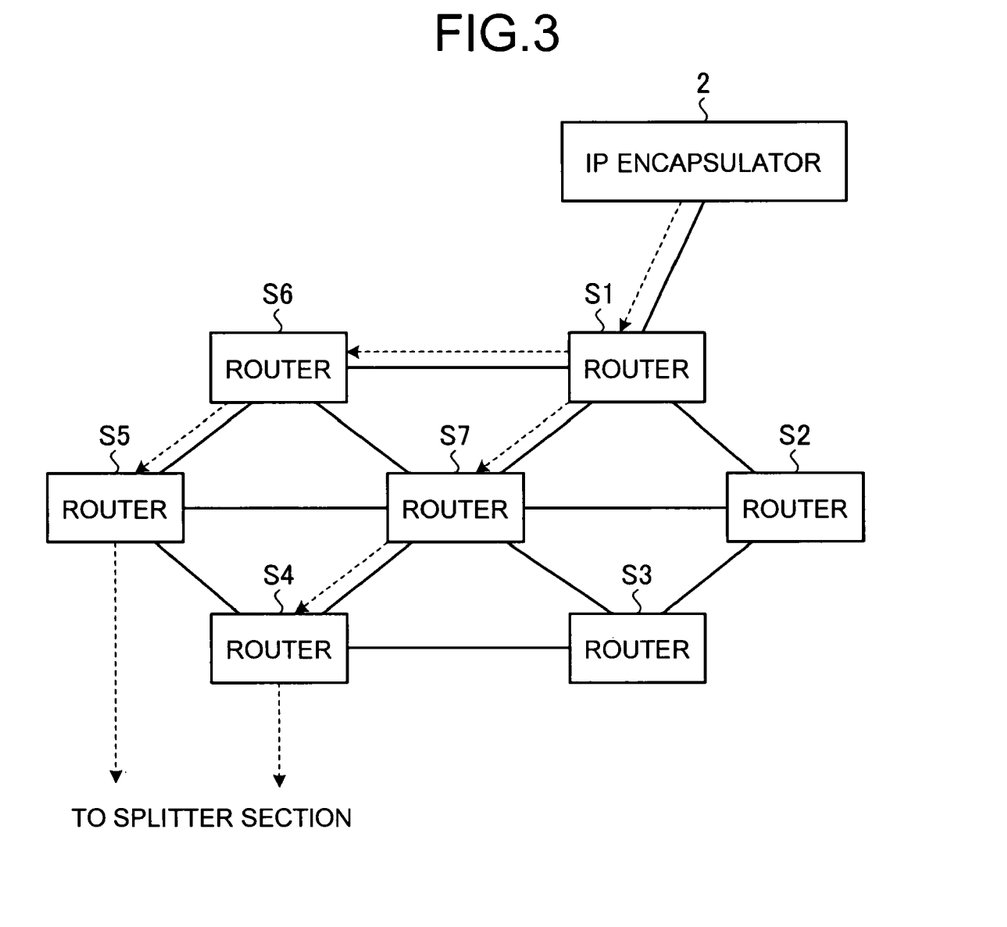
FIG. 3 is a schematic for explaining an example of a transferring route in a network shown in FIG. 1.

A transfer control performed in the MPLS section will be further explained with reference to FIGS. 3 to 5. In the MPLS section, routing for specifying the transfer route is performed by multiprotocol label switching.

An example in which the following two route settings are made for transmitting data from the IP encapsulator 2 to the splitter section will be explained. As shown in FIG. 3, one route is a transfer route sequentially going through the router S1, S6, and S5. The other route is a transfer route sequentially going through the routers S1, S7, and S4.

Figure 4:
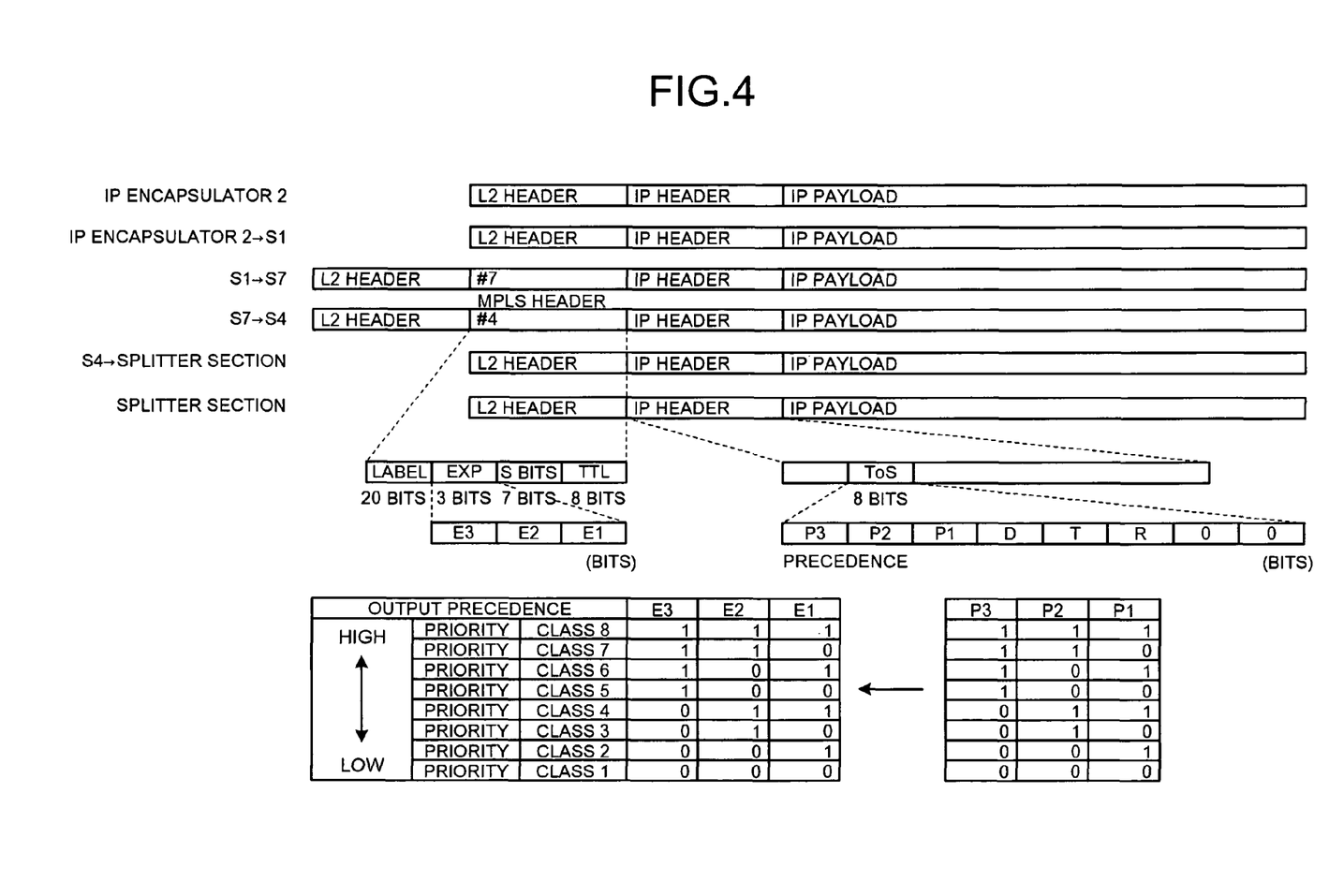
FIG. 4 is a schematic for explaining contents of header information included in a packet.

An IP packet created by the IP encapsulator 2 includes an L2 header, an IP header, and an IP payload, as shown in FIG. 4. An 8-bit TOS area is included within the IP header. The IP encapsulator 2 writes a 3-bit transfer precedence in the TOS area.

The IP encapsulator 2 sends the IP packet to the router S1 that is an input-side router in the MPLS section. The router S1 assigns an MPLS header to the IP packet. The MPLS header includes label information (20 bits), extra bits (3 bits), S bits (7 bits), and TTL bits (8 bits).

The router S1 replaces the extra bits in the MPLS header with the transfer precedence information (Precedence bits P3 to P2 in the TOS field) assigned by the IP encapsulator 2. As a result, the transfer precedence assigned by the IP encapsulator 2 can be reflected in the transfer precedence in the MPLS section.

Subsequently, the router S1 transfers the packet, to which the MPLS header is assigned, to the router S7. The router S7 rewrites the MPLS header of the received packet and transfers the resultant packet to the router S4.

The router S4 that is an output-side router in the MPLS section deletes the MPLS header of the received packet and outputs the resultant packet to the splitter section.

Figure 5:
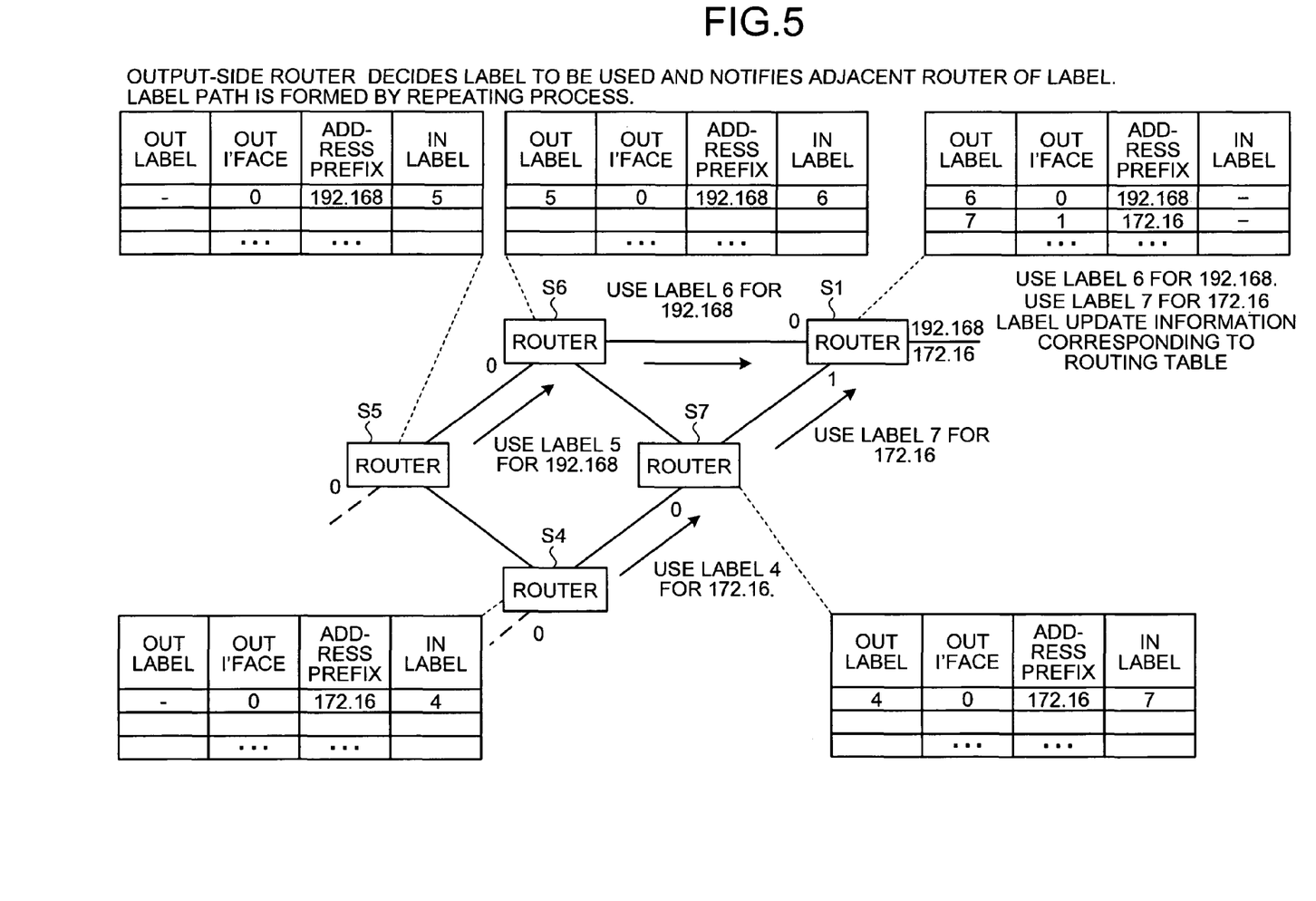
FIG. 5 is a schematic for explaining a detailed example of a routing table.

To set the route (to designate explicit routing), first, route information is exchanged using Open Shortest Path First (OSPF) or the like as shown in FIG. 5. If an address of the router S5 is 192.168, the router S5 notifies the router S6 of routing information on address 192.168. The router S6 notifies the router S1 of the routing information on address 192.168.

Similarly, if the address of the router S4 is 172.16, the router S4 notifies the router S7 of routing information on address 172.16. The router S7 notifies the router S1 of the routing information on address 172.16. As a result of the exchange of the router information, a routing table is created.

Next, the router S1 asks the routers S5 and S4, which are output-side routers, which label is used for the IP route information. Specifically, the router S1 requests the routers S5 and S4 to perform label assignment. Upon receiving the request, the router S5 notifies the router S6 to use a label 5 for the address 192.168. The router S6 notifies the router S1 to use a label 6 for the address 192.168.

Similarly, the router S4 notifies the router S7 to use a label 4 for the address 172.16. The router S7 notifies the router S1 to use a label 7 for the address 172.16. As a result of the label assignment, labels corresponding to the routing table can be locally decided.

Figure 6:
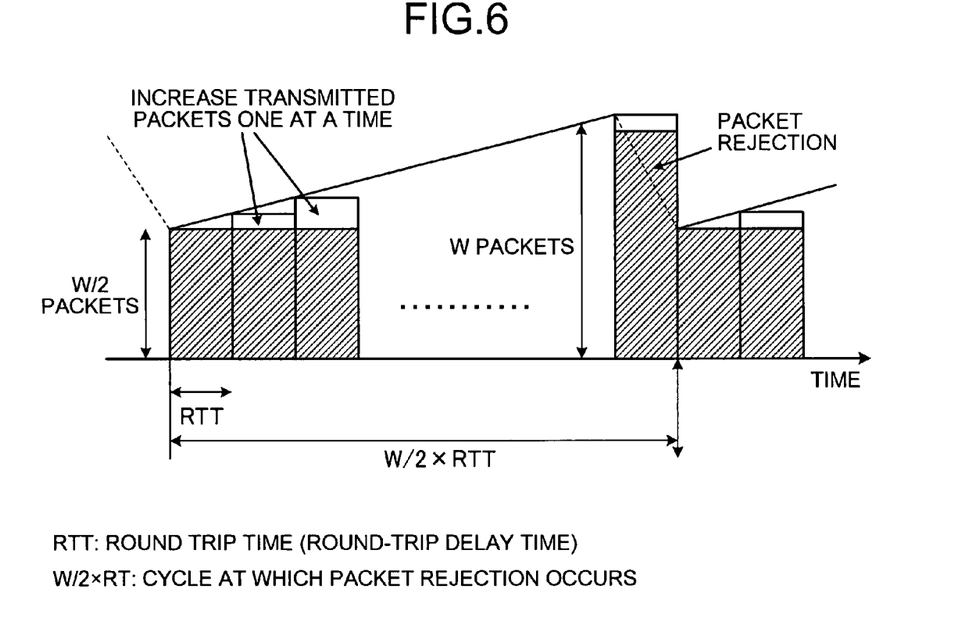
FIG. 6 is a schematic for explaining how the decision of an operation route is taken.

Next, a decision of a route used to distribute packets will be explained. The transfer route (operation route) used to distribute packets is decided by a transfer rate for transferring the packets to each SLT. Specifically, as shown in FIG. 6, first, a desired route is temporarily decided. The IP encapsulator 2 collectively transmits several packets at a certain time. Upon reception of an acknowledgement (ACK packet) to the transmitted packets, the IP encapsulator 2 increases the number of packets to be transmitted by one. At this time, the time required since the transmission of the packets until the reception of the ACK packet is called "round-trip time RTT". If the operation is repeated, a router located somewhere is congested, and packet rejection occurs to the router. If so, the IP encapsulator 2 reduces the number of transmitted packets by half.

The IP encapsulator 2 transmits W/2 packets at certain time and increases the number of transmitted packets by one packet per RTT. When W packets are transmitted, packet rejection occurs, so that the IP encapsulator 2 reduces the number of transmitted packets to W/2 packets. The value of W is acquired by repeating this operation and maintaining a steady state.

Data transfer rate $S=(W-1)/(RTT/2)$ is calculated from this model. If the calculated data transfer rate is equal to or higher than a requested value (for example, 20 Mbs for ten standard TV channels), the temporarily decided route is set as the operation route. A backup route different from the temporarily decided route can be decided by the same method.

After the operation route is decided in this way, a memory capacity of each ONU is set to a memory capacity corresponding to a delay (RTT/2) in the operation route. If a calculated delay is, for example, 400 milliseconds, the memory capacity of each ONU is set to 20 Mbps×400 ms=8 Mbit.

In this way, the memory capacity is individually set based on the delay. An increase in the amount of delay can be thereby prevented, making the amount of delay minimum. In an actual design, the memory capacity is preferably set to include a margin (for example, set to a memory capacity corresponding to twice as large as the calculated delay).

An operating point is put on a median value of the memory capacity to buffer the data in overflow direction and underflow direction. By buffering of the memory, fluctuations among packets can be absorbed, and the amount of delay can be kept constant to the packets.

The SLT to which the memory capacity is set serves as a "master", and the master sends a "memory set completion signal" to adjacent SLTs within an area. Each of the SLTs that receives the memory set completion signal serves as a slave and distributes the image packets transferred from the master to each user terminal. The SLT can convert the received image packet as required to accommodate an interface of the user terminal.

Figure 7:
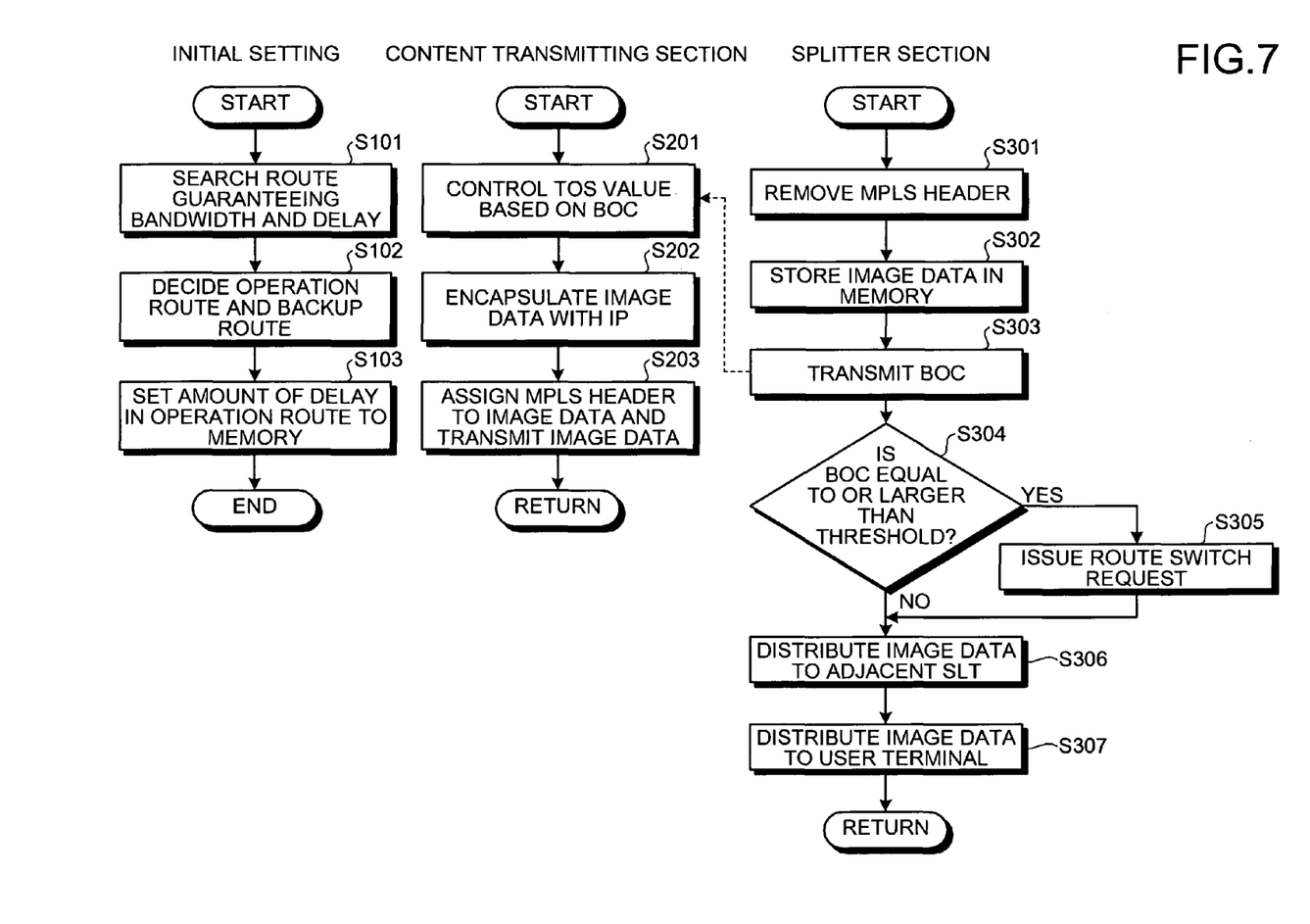
FIG. 7 is a flowchart of a process procedure performed by the broadcast distributing system shown in FIG. 1.
Figure 8:
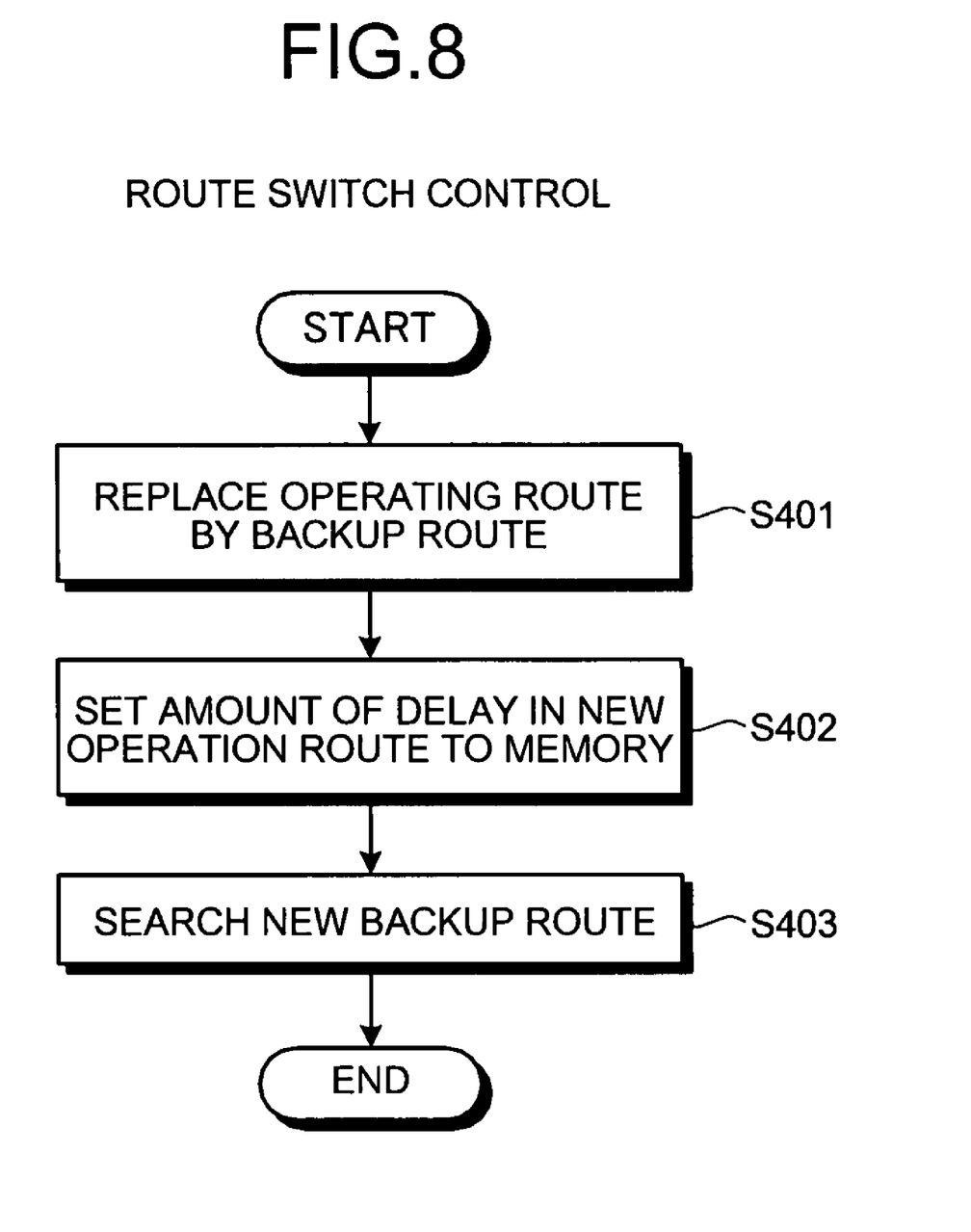
FIG. 8 is a flowchart of a route switching control.

Next, processes performed by the broadcast distributing system according to the first embodiment will be explained with reference to FIGS. 7 and 8. As shown in FIG. 7, when an initial setting of the system is made, a route in which bandwidth and delay can be guaranteed (namely, a communication rate can be secured to some extent) is searched (Step S101). The operation route and the backup route are decided using the search result (Step S102). The amount of delay in the operation route is set as the memory capacity of the SLT (Step S103), thus finishing the process.

As shown in FIG. 7, the content transmitting section repeatedly performs the following process while the system is running. First, the transfer precedence (TOS value) is controlled based on the buffer occupancy (BOC) notified by the SLT (Step S201). Image data is IP-encapsulated. The MPLS header is assigned to each packet divided from the image data, and the image data is transmitted to the network 3 (Step S203).

The splitter section repeatedly performs the process at the steps S301 to S307 while the system is running. Specifically, the splitter section removes the MPLS header assigned to the packet received from the network 3 (Step S301) and the resultant packet is stored in the memory of the SLT (Step S302).

The IP encapsulator 2 is notified of the BOC (Step S303) and compares the BOC with the predetermined threshold (Step S304). As a result of the comparison, if the BOC is equal to or smaller than the threshold (Step S304, Yes), a route switching request is issued (Step S305).

If the BOC is larger than the predetermined threshold (Step S304, No) or after completion of the route switching request (S305), the SLT distributes the data to the adjacent SLTs (Step S306) and distributes the data to each user terminal (Step S307).

If the SLT issues the route switching request, the following route switching control is performed. As shown in FIG. 8, the operation route is replaced by the backup route (Step S401). The amount of delay in the new operation route is set in the memory (Step S402), and a new backup route is then searched (Step S403), thus finishing the process.

Figure 9:
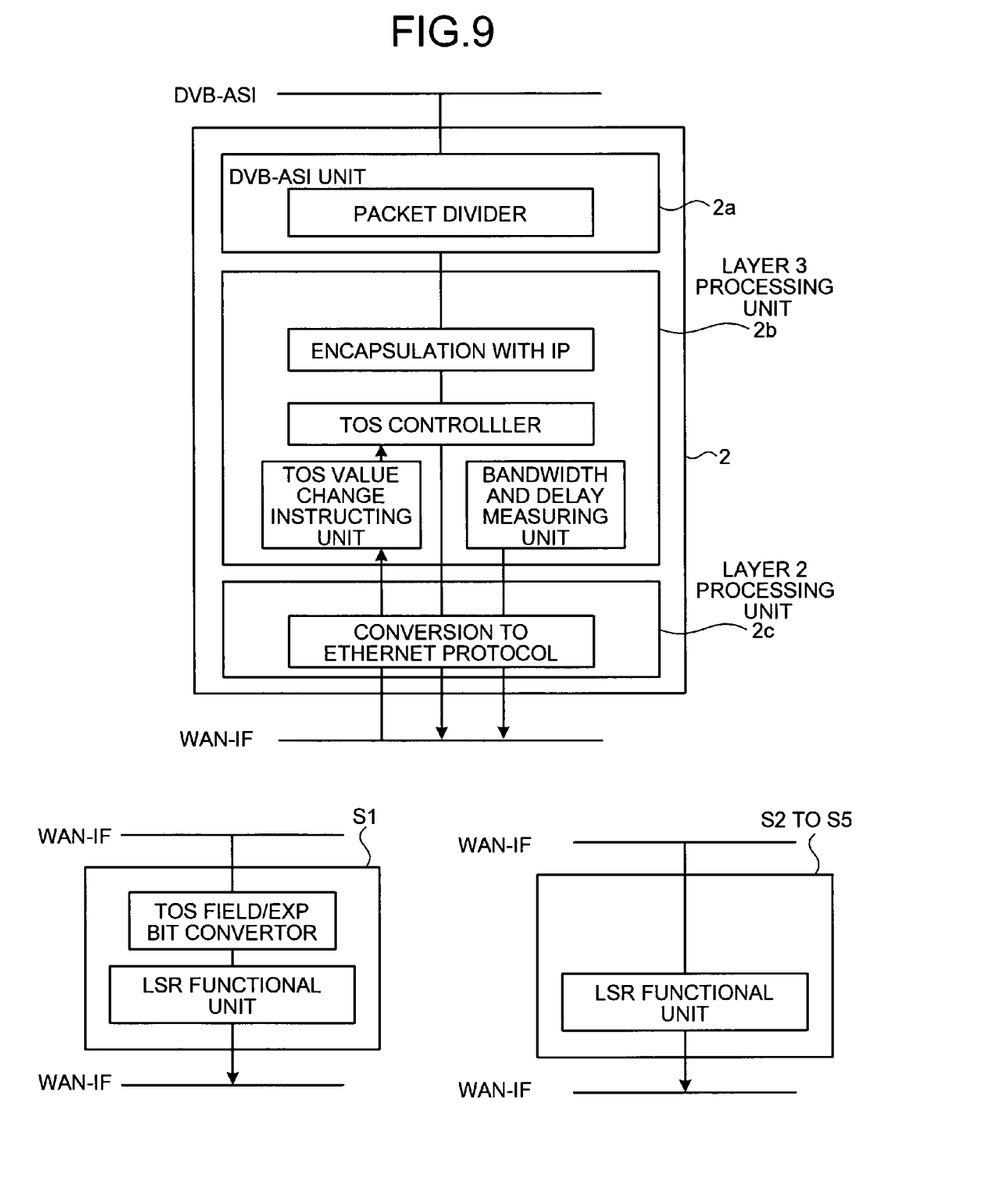
FIG. 9 is a block diagram of an IP encapsulator and a router shown in FIG. 1.

An overview of configurations of principal devices among the respective devices included in the broadcast distributing system will be explained. As shown in FIG. 9, the IP encapsulator 2 includes a digital video broadcasting-asynchronous serial interface (DVB-ASI) unit 2a, a Layer 3 processing unit 2b, and a Layer 2 processing unit 2c.

The DVB-ASI unit 2a performs a process for receiving the image data from the image distributing source 1 through a DVB-ASI and for dividing the image data into packets.

The Layer 3 processing unit 2b encapsulates the divided packets using IP, performs the TOS control on the IP-encapsulated packets, and outputs the IP-encapsulated packets. In addition, the Layer 3 processing unit 2b measures a bandwidth and a delay used for searching the operation route and the backup route, and issues a TOS value change instruction based on the BOC received from the SLT.

The Layer 2 processing unit 2c is present between the Layer 3 processing unit 2b and a wide area network interface (WAN-IF), and is responsible for a process of converting the packets to those according to an Ethernet protocol.

Each of the routers S2 to S5 includes a label switching router (LSR) function between the WAN-IFs as shown in FIG. 9. The router S1 that is the input-side router in the MPLS section includes a TOS field/EXP bit converter in addition to the LSR function. The TOS field/EXP bit converter is a functional unit that changes the transfer precedence.

Figure 10:
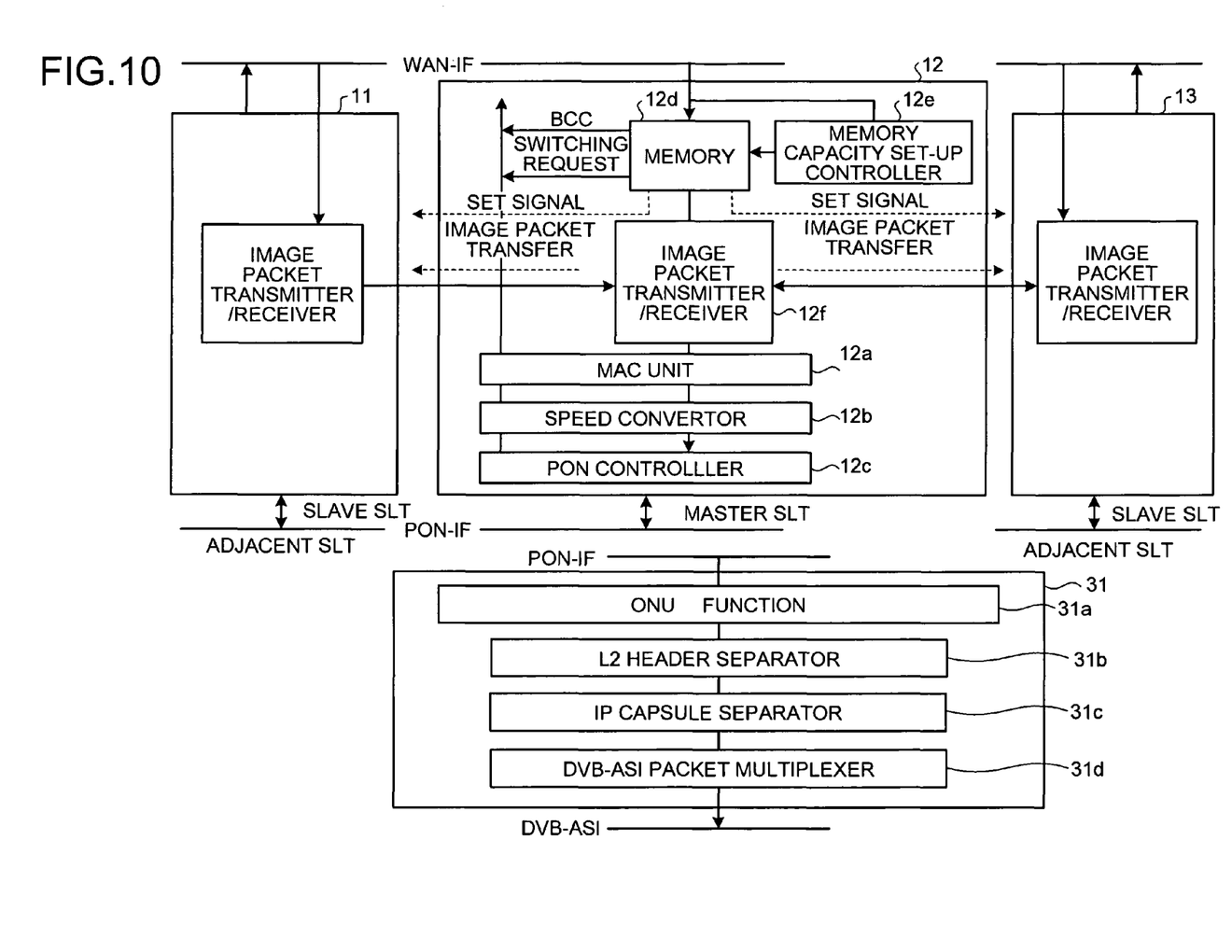
FIG. 10 is a block diagram of a subscriber line terminal (SLT) and an optical network unit (ONU)

As shown in FIG. 10, the SLT 12 includes a media access control (MAC) controller 12a, a rate converter 12b, a PON controller 12c, a memory 12d, a memory-capacity setup controller 12e, and an image packet transmitter/receiver 12f.

The memory 12d temporarily stores the received packets as already explained. The memory-capacity setup controller 12e sets the maximum capacity of the memory 12d based on the amount of delay in the operation route.

When the memory capacity is set, the memory 12d transmits a set signal to the adjacent SLTs (SLT 11 and SLT 13 in FIG. 10). The SLT 11 or 13 that receives the set signal serves as the slave, and receives the image packets transferred from the SLT 12. It is the image packet transmitter/receiver 12f that transfers the image packets.

As shown in FIG. 10, the ONU 31 includes an L2 header separator 31b, an IP capsule separator 31c, and a DVB-ASI packet multiplexer 31d in addition to an ONU function 31a.

Figure 11:
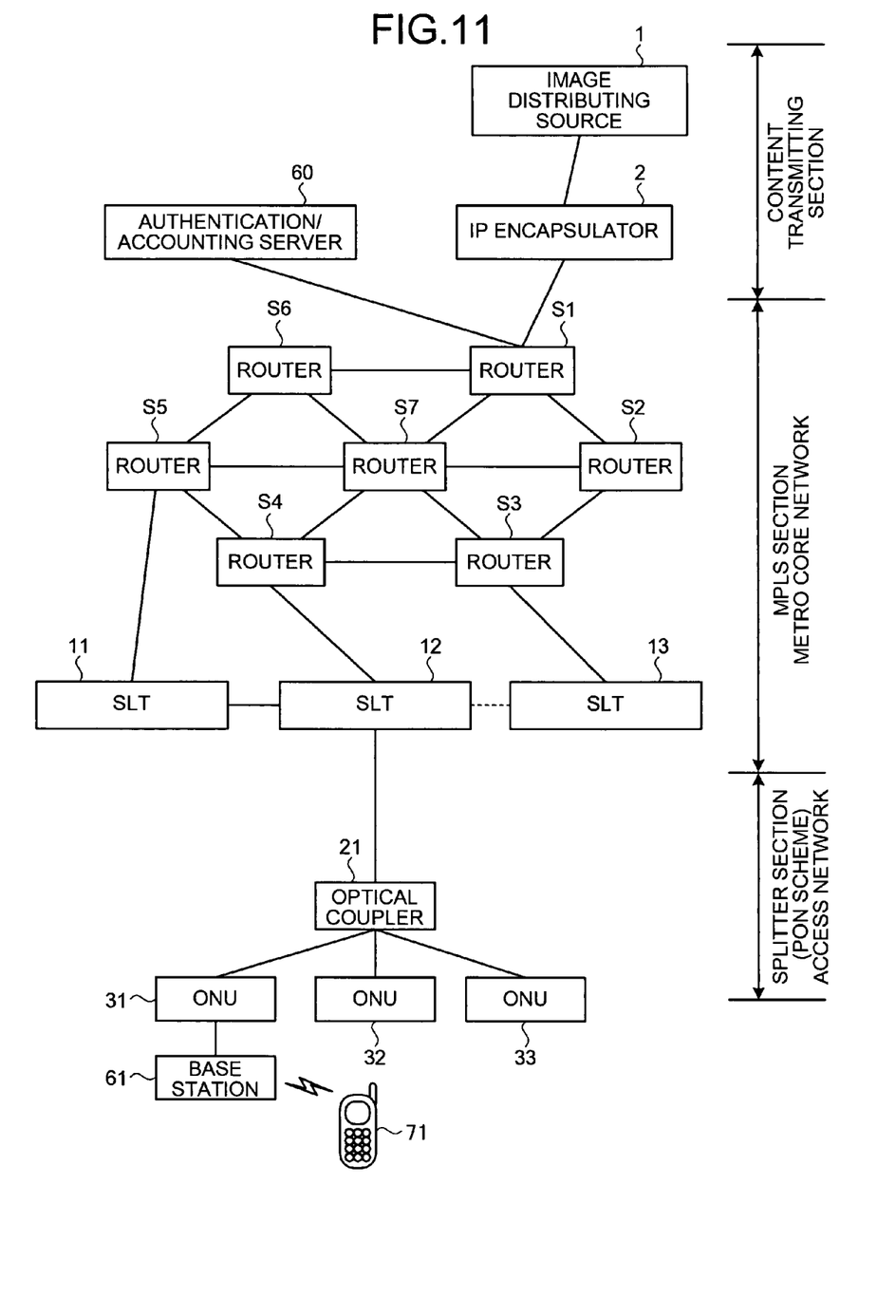
FIG. 11 is a schematic for explaining a configuration of a broadcast distributing system according to a second embodiment of the present invention.

A broadcast distributing system according to a second embodiment of the present invention will be explained. FIG. 11 is a schematic for explaining a configuration of the broadcast distributing system if a cellular telephone (i.e., a mobile terminal 71 in FIG. 10) is to receive a one-segment broadcast program via an IP network. In the configuration shown in FIG. 10, an authentication/accounting server 60 is connected to the router S1. A base station 61 that communicates with the mobile terminal 71 is connected to the ONU 31. The other configurations and operations are the same as those according to the first embodiment shown in FIG. 2. Therefore, the same constituent elements are given the same reference numbers, and will not be repeatedly explained herein.

Currently, transition of television broadcasting from analog to digital is underway. In the digital broadcasting, one radio-wave spectrum is divided into 13 segments, and 4 or 12 segments are used for stationary-type televisions during broadcasting. Alternatively, there is known a so-called "one-segment broadcasting" for mobile terminals for using only one segment during broadcasting.

The digital broadcasting is also performed by radio waves similarly to the conventional analog broadcasting. However, since invisible-inaudible areas remain with the radio-wave-based broadcasting, broadcast programs are required to be redistributed to digital divide areas using other means. In the configuration example shown in FIG. 11, a one-segment terrestrial digital mobile broadcast program can be redistributed using a mobile network already extended all areas in Japan.

In the configuration shown in FIG. 11, the mobile terminal 71 encapsulates a message with an Ethernet (registered trademark) frame, and accesses the authentication/accounting server 60. The authentication/accounting server 60 collates user information included in the packet with that included in a user database to determine whether to authenticate the mobile terminal 71. The authentication/accounting server 60 notifies the mobile terminal 71 of the authentication result.

If the mobile terminal 71 is successfully authenticated, the authentication/accounting server 60 transmits access control information acquired from the user database to the router S1. The router S1 notifies the mobile terminal 71 that the mobile terminal 71 is permitted to access the authentication/accounting server 60. The router S1 controls the access of the mobile terminal 71 to the network based on the access control information received from the authentication/accounting server 60. All communications from unauthenticated mobile terminals are blocked, excluding packets required for the authentication until the user authentication is completed. If the authentication fails, access of the mobile terminal 71 to ports is entirely rejected.

The image distributing source 1 distributes image data identical in configuration to that shown in FIG. 2 to the ONU 31. Therefore, when the mobile terminal 71 transmits a channel viewing request to the base station 61, the base station 61 transmits image data corresponding to the requested channel to the mobile terminal 71.

Likewise, in response to a channel viewing request from any other mobile terminal, the base station 61 transmits image data on one desired channel among a total of 10 channels, to the mobile terminal.

With the configuration shown in FIG. 10, an image distributing method for the one-segment terrestrial digital mobile broadcasting using the mobile network exhibits the following effects. A channel scan can be accelerated when desired access requests are transmitted from a plurality of mobile terminals by constantly distributing a total of 10 channels' worth of image data to the base station. Use of bandwidth in the terminal section can be streamlined by transmitting only the requested channel to the mobile terminal.

As explained so far, in the broadcast distributing system, the broadcast distributing method, and the network system device according to the embodiments of the present invention, the SLT 12 includes the memory function of storing the broadcast program data, and performs the TOS control and the transfer route switching control based on the BOC of the memory. It is, therefore, possible to actualize simulcasting of broadcast programs via the IP network.

Devices and facilities required to construct the broadcast distributing system according to the present invention are not necessarily owned by a single company. It goes without saying that the present invention can be implemented using, for example, a network established by a different company or carrier.

According to an aspect of the present invention, a broadcast distributing system and a broadcast distributing method that can simulcast a broadcast program via an IP network can be acquired.

According to another aspect of the invention, a broadcast distributing system that can avoid broadcast distribution interruptions due to changes in traffic states can be acquired.

According to another aspect of the invention, a broadcast distributing system that can distribute broadcast programs while reducing the load placed on the network can be acquired.

According to still another aspect of the invention, a network device that can pass on the transfer precedence between different networks can be acquired.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A broadcast distributing system that divides broadcast data into a plurality of packet data and distributes the packet data via a network, the broadcast distributing system comprising:

a transmitter that sets a transfer precedence of each of the packet data and that transmits each of the packet data into the network based on the transfer precedence set in the packet data;

a receiver that receives the packet data transmitted by the transmitter via the network, temporarily stores the packet data in a memory and outputs the packet data stored in the memory, and reports a buffer occupancy of the memory to the transmitter; and a memory setting unit that sets a capacity of the memory based on a delay generated when a first transfer route is used, wherein the transmitter sets the transfer precedence of each of the packet data based on the buffer occupancy of the memory, the receiver transmits a set signal to an adjacent receiver when a capacity of the memory is set to the receiver by the memory setting unit, and the adjacent receiver receives the set signal, and receives the packet data transferred from the receiver that transmits the set signal.

2. The broadcast distributing system according to claim 1, further comprising:

a route setting unit that sets the first transfer route of the packet data in the network in advance, wherein the transmitter transmits the packet data via the first transfer route; and a route switching unit that switches the first transfer route to a second transfer route different from the first transfer route when the buffer occupancy of the memory is equal to or smaller than a predetermined amount, wherein the transmitter transmits the packet data via the second transfer route.

3. The broadcast distributing system according to claim 1, wherein the network transfers the packet data by multiprotocol label switching, and the broadcast distributing system further comprises a handover unit that hands over the transfer precedence set for the packet data to a multiprotocol label switching header.

4. A method of dividing broadcast data into a plurality of packet data and distributing the packet data via a network, the method being realized in a broadcast distributing system that includes a transmitter connected to a receiver via a network, the method comprising:

the transmitter setting a transfer precedence of each of the packet data and transmitting each of the packet data into the network based on the transfer precedence set in the packet data;

the receiver receiving the packet data transmitted by the transmitter via the network, temporarily storing the packet data in a memory and outputting the packet data stored in the memory, and reporting a buffer occupancy of the memory to the transmitter; and a memory setting unit that sets a capacity of the memory based on a delay generated when a first transfer route is used, wherein the transmitter sets the transfer precedence of each of the packet data based on the buffer occupancy of the memory, the receiver transmits a set signal to an adjacent receiver when capacity of the memory is set, and the adjacent receiver receives the set signal serves as a slave, and receives the packet data transferred from the receiver that transmits the set signal.

5. The method according to claim 4, further comprising:

the transmitter setting the first transfer route of the packet data in the network in advance, wherein the transmitting includes transmitting the packet data via the first transfer route; and the transmitter switching the first transfer route to a second transfer route different from the first transfer route when the buffer occupancy of the memory is equal to or smaller than a predetermined amount, wherein the transmitter transmits the packet data via the second transfer route.

6. The broadcast distributing method according to claim 4, wherein the network transfers the packet data by multiprotocol label switching, and the broadcast distributing method further comprises handing over the transfer precedence set for the packet data to a multiprotocol label switching header.

7. The broadcast distributing system according to claim 1, wherein the memory setting unit sets a capacity of the memory to include a margin.

* * * * *